A. ANGELL.
Process and Machine for Disintegrating Ramie, &c.

No. 219,668.   Patented Sept. 16, 1879.

Witnesses.
Otto Hufeland.
W. C. Hauff.

Inventor
Albert Angell.
by
Van Santvoord & Hauff
his attorneys

UNITED STATES PATENT OFFICE.

ALBERT ANGELL, OF EAST ORANGE, ASSIGNOR TO HIMSELF, ROBERT BLAKE, OF NEWARK, AND CHARLES TAYLOR, OF ENGLEWOOD, N. J.

IMPROVEMENT IN PROCESSES AND MACHINES FOR DISINTEGRATING RAMIE, &c.

Specification forming part of Letters Patent No. 219,668, dated September 16, 1879; application filed July 5, 1878.

*To all whom it may concern:*

Be it known that I, ALBERT ANGELL, of East Orange, in the county of Essex and State of New Jersey, have invented a new and Improved Process and Machine for Disintegrating Ramie and other Fibrous Plants, which invention is fully set forth in the following specification, reference being had to the accompanying drawings, in which—

Figure 1:
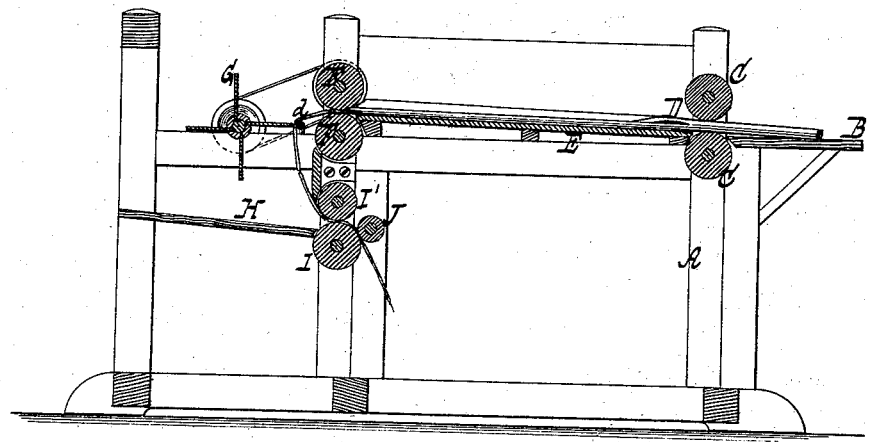
Figure 2:
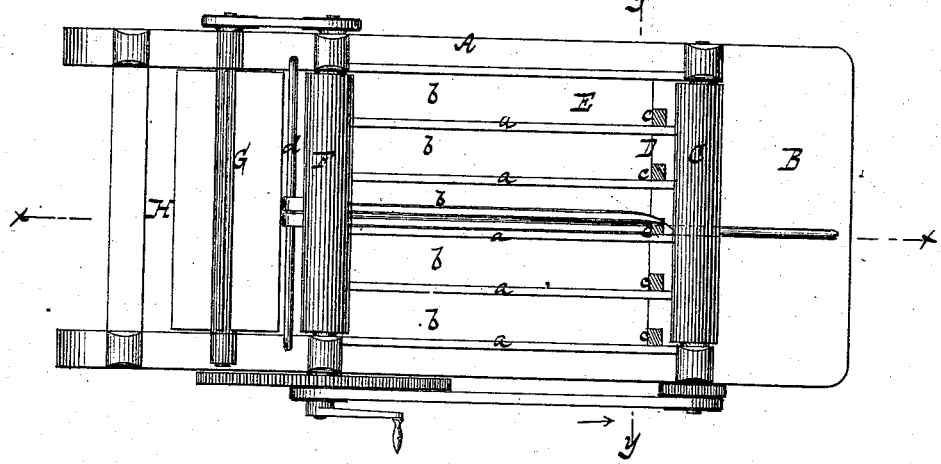
Figure 3:
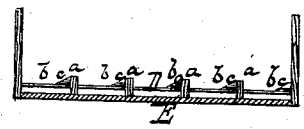

Figure 1 represents a longitudinal vertical section in the plane $x\,x$, Fig. 2. Fig. 2 is a plan or top view. Fig. 3 is a transverse section in the plane $y\,y$, Fig. 2.

Similar letters indicate corresponding parts.

This invention consists in a certain process for disintegrating ramie and other fibrous plants, by first splitting the stalk, then exposing each half to the action of crushing-rollers, then removing from each half the pith by a suitable beater acting thereon on one side, and the skin or bark by a suitable grinding-roller acting on its opposite side.

The invention also consists in the combination, in a machine for disintegrating ramie and other fibrous plants, of feed-rollers, a splitting-knife, a series of separate channels, each adapted to receive and guide the two halves of a stalk of ramie or other fibrous plants, and crushing-rollers, which receive the split stalks from the guide-channels for breaking the connection of the fibers with the pith and skin. A beater, which acts on the split stalks as the same pass from the crushing-rollers, serves to detach the pith from the fibers, and the skin is finally removed by the action of a grinding-surface. On the splitting-knife are secured suitable cams for turning the upper half of the split stalk, so that both halves pass through the crushing-rollers with the pith side facing upward.

In the drawings, the letter A designates a frame made of wood or any other suitable material. To one end of this frame is secured a table, B, over which the stalks of ramie or other fibrous plants are fed to the feed-rollers C. Close behind these feed-rollers is situated a knife, D, which is secured to a platform, E, in a position somewhat elevated above said platform and with its cutting-edge pointing toward the feed-rollers, so that the stalks which are carried forward by the action of said feed-rollers are split lengthwise, one half of each stalk passing beneath and the other half above said knife. On the platform E are secured a series of strips, $a$, of wood or other suitable material, whereby a series of channels, $b$, are formed, which serve to keep the stalks separate, one from the other. The knife D is provided with inclined cams or projections $c$, (best seen in Figs. 2 and 3,) one in each of the channels $b$. These projections serve to turn over the upper half of the stalks as the same are being split by the action of the knife, so that both halves of each stalk pass over the platform E with the pith side up. From this platform the split stalks pass between crushing-rollers F, which are either made of india-rubber or of metal, and fluted or plain, as may be deemed best for particular plants. For ramie-stalks I prefer smooth rubber rollers or fluted metal-rollers. By the action of these rollers the stalks are compressed and the pith and scale are loosened from the bark. At the same time the crushing-rollers serve to carry the broken stalks forward over a stationary bar, $d$, to be exposed to the action of a beater, G. In the example shown in the drawings this beater is composed of one or more wings or arms, which radiate from a revolving shaft; but I do not wish to restrict myself to this particular construction. By the action of this beater the pith is separated from the bark and the stalks are turned inward toward a table, H, so that their ends are caught between rollers I I', which revolve at a velocity greater than the crushing-rollers F, so that they draw the stalks along and assist in separating the pith from the bark.

Close to the lower drawing-roller, I, is situated a grinding-roller, J, which has a rapid revolving motion. By referring to Fig. 1 it will be seen that the stalks, in passing over this lower drawing-roller, are so situated that their skin becomes exposed to the action of the grinding-roller, and by the action of this grinding-roller the skin is removed and the fibers become freed from the impurities adhering to them.

In the example shown in the drawings the grinding-roller J is provided with a grinding-surface of sand-paper; but said grinding-roller may be constructed of any other material suitable for the purpose.

The various rollers and the beater are geared together either by cog-wheels or by belts, so that they revolve at the required speed.

What I claim as new, and desire to secure by Letters Patent, is—

1. The within-described process for disintegrating ramie and other fibrous plants, by first splitting the stalk, then exposing each half to the action of crushing-rollers, then removing from each half of said split and crushed stalk the pith by a suitable beater acting thereon on one side, and the skin or bark by a suitable grinding-roller acting on the other side of said split and crushed stalk, substantially as and for the purpose specified.

2. The combination, with the feed-rollers and with the splitting-knife, of inclined projections or cams for turning over the upper halves of the stalks, substantially as set forth.

3. The combination, with the feed-rollers and with the splitting-knife, of guide-channels $b$, to keep the two halves of each stalk separate, substantially as described.

4. The combination, with the feed-rollers, the splitting-knife, and the guide-channels, of crushing-rollers F, for disengaging the pith from the bark, substantially as set forth.

5. The combination, with the feed-rollers, the splitting-knife, and the crushing-rollers, of a beater, G, constructed and operating substantially as and for the purpose described.

6. The combination, with the feed-rollers, the splitting-knife, the crushing-rollers, and the beater, of drawing-rollers I I', constructed and operating substantially as set forth.

7. The combination, with the feed-rollers, the splitting-knife, the crushing-rollers, the beater, and the drawing-rollers, of a grinding-roller for removing the skin, substantially as described.

8. In combination with the feed-rollers, the splitting-knife, the crushing-rollers, the beater, and the drawing-rollers, a stationary bar for conducting the split stalks to the drawing-rollers, substantially as described.

In testimony that I claim the foregoing I have hereunto set my hand and seal this 2d day of July, 1878.

ALBERT ANGELL. [L. S.]

Witnesses:
E. F. KASTENHUBER,
J. VAN SANTVOORD.